(12) United States Patent  (10) Patent No.: US 8,541,250 B2
Hirata et al.  (45) Date of Patent: Sep. 24, 2013

(54) METHOD AND SYSTEM FOR CONTINUOUSLY MANUFACTURING LIQUID CRYSTAL DISPLAY DEVICE

(75) Inventors: Satoshi Hirata, Ibaraki (JP); Seiji Kondo, Ibaraki (JP); Takaichi Amano, Ibaraki (JP); Tadashi Yokouchi, Ibaraki (JP); Akira Kunikawa, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 137 days.

(21) Appl. No.: 13/268,636

(22) Filed: Oct. 7, 2011

(65) Prior Publication Data

US 2012/0094410 A1    Apr. 19, 2012

(30) Foreign Application Priority Data

Oct. 13, 2010   (JP) ................................. 2010-230535

(51) Int. Cl.
*H01L 21/00* (2006.01)
(52) U.S. Cl.
USPC .................................... 438/30; 257/E33.012
(58) Field of Classification Search
USPC .................................... 438/30; 257/E33.012
See application file for complete search history.

(56) References Cited

U.S. PATENT DOCUMENTS

| 8,172,631 B2 * | 5/2012 | Hirata et al. ............... 445/24 |
| 8,211,253 B2 * | 7/2012 | Yura et al. ............... 156/64 |
| 8,272,421 B2 * | 9/2012 | Hada et al. ............... 156/556 |
| 2009/0199950 A1 | 8/2009 | Kitada et al. |
| 2010/0186890 A1 | 7/2010 | Kitada et al. |
| 2010/0282406 A1 | 11/2010 | Kitada et al. |
| 2010/0283943 A1 | 11/2010 | Kimura et al. |
| 2010/0288420 A1 | 11/2010 | Kimura et al. |
| 2010/0288441 A1 | 11/2010 | Kitada et al. |
| 2010/0316817 A1 | 12/2010 | Kimura et al. |
| 2012/0160420 A1 | 6/2012 | Kimura et al. |
| 2012/0180930 A1 | 7/2012 | Kimura et al. |
| 2012/0211167 A1 | 8/2012 | Kimura et al. |
| 2012/0216937 A1 | 8/2012 | Kimura et al. |

FOREIGN PATENT DOCUMENTS

| JP | 03-208019 A | 9/1991 |
| JP | 2000-284269 A | 10/2000 |
| JP | 2001-117065 A | 4/2001 |

(Continued)

OTHER PUBLICATIONS

Japanese Office Action dated Sep. 11, 2012, issued in corresponding Japanese Patent Application No. 2010-230535, with English translation (11 pages).

*Primary Examiner* — Trung Q Dang
(74) *Attorney, Agent, or Firm* — Westerman, Hattori, Daniels & Adrian, LLP

(57) ABSTRACT

A method for continuously manufacturing a liquid crystal display device by bonding a polarizing film to a liquid crystal panel with a pressure-sensitive adhesive interposed therebetween, includes a polarizing film supply step including drawing an optical film laminate from the continuous roll placed in a dry environment, cutting at least a polarizing film and a pressure-sensitive adhesive, while leaving a carrier film uncut and feeding the sheet piece and the pressure-sensitive adhesive piece; a liquid crystal panel supply step including feeding the liquid crystal panel in a first humid environment having a relative humidity higher than that of the dry environment; and a bonding step including bonding the sheet piece to the liquid crystal panel with the pressure-sensitive adhesive piece interposed therebetween in a second humid environment having a relative humidity higher than that of the dry environment.

14 Claims, 4 Drawing Sheets

(56) References Cited

FOREIGN PATENT DOCUMENTS

| JP | 2003-211467 A | 7/2003 |
| JP | 2009-061498 A | 3/2009 |
| JP | 2009-175653 A | 8/2009 |
| JP | 2010-170126 A | 8/2010 |
| WO | 2009-128241 A1 | 10/2009 |

* cited by examiner (a)

(b)

METHOD AND SYSTEM FOR CONTINUOUSLY MANUFACTURING LIQUID CRYSTAL DISPLAY DEVICE

BACKGROUND OF THE INVENTION

1. Field of the Invention

The invention relates to a method and a system for continuously manufacturing a liquid crystal display device.

2. Description of the Related Art

There is proposed a polarizing film bonding method that includes: providing a polarizing film formed on one side of a carrier film with a pressure-sensitive adhesive interposed therebetween; cutting the polarizing film at predetermined intervals in the feed direction, while leaving the carrier film uncut, so that a sheet piece of the polarizing film is formed (such cutting is called "half cutting); then peeling off the sheet piece from the carrier film; and bonding the pressure-sensitive adhesive, which is peeled off and therefore has an exposed surface, to a liquid crystal panel (this is called "continuous roll bonding method") (Japanese Patent Application Laid-Open (JP-A) No. 2009-61498).

Such a continuous roll bonding method makes it possible to reduce the number of steps, to reduce the bonding process time, and to increase the polarizing film yield. When the continuous roll bonding method is performed, a continuous roll, which is a roll of a strip-shaped film laminate including a carrier film and a polarizing film placed on the carrier film with a pressure-sensitive adhesive interposed therebetween, is plated in a specific position, and the film laminate is drawn from the continuous roll. From the view point of productivity, it is desired that long-term continuous production should be possible with a single continuous roll. To achieve this, the length of the polarizing film per continuous roll should be as long as possible.

The continuous roll bonding method is also performed using an area in which a polarizing film is drawn from a continuous roll, an area in which the polarizing film is fed (sometimes called buffer area), a liquid crystal panel feed area, and a liquid crystal display device (including the liquid crystal panel and the polarizing film bonded thereto) feed area, and these areas are placed on a continuous line.

Patent Document 1: Japanese Patent Application Laid-Open (JP-A) No. 2009-61498.

SUMMARY OF THE INVENTION

In the continuous roll bonding method, the liquid crystal panel feed area and the liquid crystal display device feed area should prevent electrostatic destruction of circuits due to static build-up on the liquid crystal panel or the liquid crystal display device and prevent the occurrence of defects due to adsorption of foreign particles in the air, and therefore, the relative humidity in the steps of feeding the liquid crystal panel and the liquid crystal display device should be set relatively high so that static build-up can be prevented. When the length of the polarizing film per continuous roll is made large so that long-term continuous production can be performed with a single continuous roll as mentioned above, a single continuous roll is placed for a long time at a specific location of the bonding apparatus. In some cases, the continuous roll absorbs moisture from its end and swells so that the end part of the polarizing film is deformed into a wave shape (this deformation is called "wavy curling") during the bonding. The wavy curling becomes a cause of problems such as bubbles and bonding misalignment during the bonding to the liquid crystal panel. FIGS. 1A and 1B show wavy curling of the end part of an optical film laminate (polarizing film) drawn from a continuous roll.

When the relative humidity in the steps of feeding the liquid crystal panel and the liquid crystal display device is set relatively high as mentioned above, the continuous manufacturing line may allow the air to flow from the liquid crystal panel and liquid crystal display device feed area to the polarizing film draw area. For example, when the continuous roll is placed in the polarizing film draw area for a long time or when it takes a long time to finish the bonding of the polarizing film wound near the core of the continuous roll, the polarizing film of the continuous roll absorbs moisture in the air, which flows from the liquid crystal panel and liquid crystal display device feed area, and swells, so that the end part of the polarizing film undergoes wavy curling as mentioned above during the bonding, which causes problems such as bubbles and bonding misalignment during the bonding to the liquid crystal panel.

Therefore, the invention has been made in view of the above problems, and an object of the invention is to provide a method and a system for continuously manufacturing a liquid crystal display device, which make it possible to suppress moisture absorption of a continuous roll including a roll of a laminate of a carrier film and a polarizing film or sheet pieces of polarizing film with a pressure-sensitive adhesive interposed therebetween, to suppress wavy curling of the sheet piece during the bonding of the sheet piece to a liquid crystal panel, and to successfully suppress the occurrence of bubbles or bonding misalignment during the bonding of the sheet piece to the liquid crystal panel. Another object of the invention is to provide a method and a system for continuously manufacturing a liquid crystal display device, which make it possible to successfully suppress electrostatic destruction of circuits or adsorption of foreign particles in the air due to static build-up on the liquid crystal panel.

As a result of earnest studies, the inventors have overcome the problem of bubbles and bonding misalignment during the bonding of a polarizing film to a liquid crystal panel and successfully avoided electrostatic destruction of circuits or adsorption of foreign particles in the air due to static build-up on a liquid crystal panel by configuring a polarizing film draw area and a liquid crystal panel and liquid crystal display device feed area so that they have different humidity environments and by making the relative humidity of the polarizing film draw area lower than that of the liquid crystal panel and liquid crystal display device feed area, and have completed the invention.

The invention is directed to a method for continuously manufacturing a liquid crystal display device by bonding a polarizing film to a liquid crystal panel with a pressure-sensitive adhesive interposed therebetween, includes:

a polarizing film supply step including drawing an optical film laminate from a continuous roll placed in a dry environment, wherein the continuous roll comprises a roll of an optical film laminate comprising at least a long polarizing film having a width corresponding to a width of the liquid crystal panel and a carrier film placed on the polarizing film with a pressure-sensitive adhesive interposed therebetween, cutting at least the polarizing film and the pressure-sensitive adhesive at predetermined intervals, while leaving the carrier film uncut, so that a sheet piece of the polarizing film and a pressure-sensitive adhesive piece are obtained, and feeding the sheet piece and the pressure-sensitive adhesive piece which are placed on the carrier film;

a liquid crystal panel supply step comprising feeding the liquid crystal panel in a first humid environment having a relative humidity higher than that of the dry environment; and a bonding step including bonding the sheet piece to the liquid crystal panel with the pressure-sensitive adhesive piece interposed therebetween in a second humid environment having a relative humidity higher than that of the dry environment, wherein the sheet piece is fed by the polarizing film supply step, and the liquid crystal panel is fed by the liquid crystal panel supply step.

According to this feature, moisture absorption of the continuous roll can be suppressed, so that wavy curling of the polarizing film can be suppressed from the draw start to the draw end and that the occurrence of bubbles or bonding misalignment can be successfully suppressed during the bonding to the liquid crystal panel. In addition, static build-up on the liquid crystal panel can be suppressed during the feeding of the liquid crystal panel or the bonding of the sheet piece of polarizing film, so that electrostatic destruction of circuits or deposition of foreign particles from the air can be successfully suppressed.

In an embodiment of the invention, in a continuous liquid crystal display device manufacturing area, a polarizing film draw area is separated from a panel feed area, wherein the continuous liquid crystal display device manufacturing area is an area in which the liquid crystal display device is continuously manufactured, the polarizing film draw area is an area in which the optical film laminate is drawn from the continuous roll, and the panel feed area is an area in which the liquid crystal panel and the liquid crystal display device are fed, the panel feed area is kept in a humid state, and the polarizing film draw area is kept in a state drier than the panel feed area.

According to this feature, the panel feed area having a humid state is separated from the polarizing film draw area, and the polarizing film draw area is kept in a state drier than the panel feed area, so that moisture absorption of the continuous roll, typically moisture absorption of the end face of the polarizing film, can be successfully suppressed and that wavy curling of the sheet piece can be successfully suppressed during the bonding of the sheet piece, and therefore, the occurrence of bubbles or bonding misalignment can be more successfully suppressed during the bonding to the liquid crystal panel. The term "humid state" can be represented by a relative humidity value of more than 45% RH. The term "dry state" can be represented by a relative humidity value less than that of the "humid state."

In an embodiment of the invention, the polarizing film draw area has a relative humidity of from 10% RH to 45% RH.

According to this feature, the relative humidity of the polarizing film draw area is kept at a level of 10% RH to 45% RH, so that moisture absorption of the continuous roll, typically moisture absorption of the end face of the polarizing film, can be successfully suppressed and that wavy curling of the sheet piece can be successfully suppressed during the bonding of the sheet piece, and therefore, the occurrence of bubbles or bonding misalignment can be successfully suppressed during the bonding to the liquid crystal panel. The relative humidity of the polarizing film draw area, which is preferably in the range of from 10% RH to 45% RH, is more preferably from 20% RH to 45% RH, even more preferably from 25% RH to 45% RH. Since the polarizing film draw area cannot have a sealed structure with completely no opening, it is difficult to set the relative humidity of the area at less than 10% RH. From the view point of actual production, therefore, the relative humidity is preferably 10% RH or more.

The term "long polarizing film having a width corresponding to the width of the liquid crystal panel" is intended to, include not only a polarizing film whose width is completely the same as the width of the liquid crystal panel but also a polarizing film whose width is substantially the same as the width of the liquid crystal panel or a polarizing film whose width is shorter than the width of the liquid crystal panel to such an extent that there is no problem with the design of the product.

In an embodiment of the invention, the panel feed area has a relative humidity more than 45% RH and less than 100% RH.

According to this feature, the relative humidity of the polarizing film draw area is kept at a level of 10% RH to 45% RH, and the relative humidity of the panel feed area is kept at a level more than 45% RH and less than 100% RH, so that electrostatic destruction of circuits or adsorption of foreign particles in the air due to static build-up on the liquid crystal panel can be avoided, moisture absorption of the continuous roll, typically moisture absorption of the end face of the polarizing film, can be successfully suppressed, and wavy curling of the sheet piece can be successfully suppressed during the bonding of the sheet piece, and therefore, the occurrence of bubbles or bonding misalignment can be more successfully suppressed during the bonding to the liquid crystal panel. The relative humidity of the panel feed area, which is preferably in the range of more than 45% RH to less 100% RH, is more preferably from 50% RH to 80% RH, even more preferably from 60% RH to 80% RH.

In an embodiment of the invention, the relative humidities of the polarizing film draw area, the panel feed area, and a polarizing film feed area, which is an area in which the polarizing film is fed after it exits from the polarizing film draw area and until before it enters the inlet of the panel feed area, preferably satisfy the relation (the relative humidity of the polarizing film draw area)≦(the relative humidity of the polarizing film feed area) or the relation (the relative humidity of the polarizing film feed area)≦(the relative humidity of the panel feed area), and the relation (the relative humidity of the polarizing film draw area)<(the relative humidity of the panel feed area) (hereinafter such conditions will be referred to as the "inter-area relative humidity conditions").

According to this feature, the polarizing film feed area can be provided adjacent to and between the polarizing film draw area and the panel feed area, so that the relative humidity difference can be reduced between the polarizing film draw area and the panel feed area.

For example, the relative humidity of each area may be measured with a hygrometer by the method described below. The area is set at a certain temperature and a certain humidity. When the fluctuations go down so that the set values are reached, measurement is performed respectively at the center of the area (the central position with respect to each of the longitudinal direction, the width direction perpendicular to the longitudinal direction, and the depth direction) in planar view of the area and at the four corners of a plane in planar view of the area, and the average of the measured values is calculated. For example, when the area is a rectangular parallelepiped, the measurement is performed at five points: the four corners of a plane (the top plane) in planar view and the point of intersection of the two diagonal lines of the plane (the center).

In an embodiment of the invention, the polarizing film or the sheet piece in the polarizing film feed area preferably has a water content of less than 4.5%. When the water content is less than 4.5%, wavy curling of the sheet piece is less likely to occur during the bonding, and bonding failure caused by this can be more successfully reduced.

The water content may be measured and calculated by the method described below. At the outlet of the polarizing film feed area, the polarizing film being placed on the carrier film is cut into a measurement sample with a size of 300 mm in the longitudinal direction and a size of 300 mm in the width direction perpendicular to the longitudinal direction. Immediately after the cutting, the carrier film and, if present, other components are peeled off from the measurement sample, and the weight of the polarizing film (carrying the pressure-sensitive adhesive) is measured as the weight before drying. After the measurement of the weight, the polarizing film (carrying the pressure-sensitive adhesive) is placed in an oven and dried at 120° C. for 2 hours. Subsequently, the dried polarizing film (carrying the pressure-sensitive adhesive) is taken out of the oven, and its weight is measured as the weight after drying. The water content (%) is calculated from the formula [{(the weight before drying)-(the weight after drying)}/(the weight before drying)]×100. For example, the average of the measurements of three samples (n=3) is calculated as the water content.

Each area may be surrounded by partition means for separating the areas from one another. For example, the partition means includes a partition wall, in which a certain opening may be formed so that the carrier film and the polarizing film, the liquid crystal panel, the liquid crystal display device, or the like can be fed. The partition means also preferably includes barrier means for blocking free movement of the air (for example, humid air) into and out of each area at the boundary of each area. Examples of the barrier means include an air curtain and a partition wall for blocking, etc., and these may be used alone or in any combination.

The invention is to directed to a method for continuously manufacturing a liquid crystal display device, comprises providing a sheet piece of polarizing film on each of both surfaces of a liquid crystal panel with a pressure-sensitive adhesive interposed therebetween by the method described above, wherein a first polarizing film draw area and a second polarizing film draw area are placed on one side of a continuous manufacturing area and, in planar view, opposed to a panel feed area that is placed on the other side of the continuous manufacturing area, wherein the first polarizing film draw area is an area in which a polarizing film and a carrier film are drawn from a first continuous roll, and the second polarizing film draw area is an area in which a polarizing film and a carrier film are drawn from a second continuous roll.

According to this feature, the first and second polarizing filth draw areas are opposed to the panel feed area in planar view, so that the first and second polarizing film draw areas do not overlap with the panel feed area along the vertical axis direction. Therefore, there is no need to take care of the movement of the air in the vertical direction, in which humid air can easily move, and the first or second polarizing film draw area and the panel feed area can be successfully configured to have different relative humidity environments, which makes it possible to successfully bond sheet pieces to both sides of a liquid crystal display device. In addition, the movement of the air from the panel feed area (which has a relative humidity higher than that of the air in the polarizing film draw area) to the first or second polarizing film draw area involves transverse movement in planar view. According to the feature, the cross-section of the path in the transverse direction can be small, and the movement of the air through the path only has to be blocked, which makes it possible to easily form barrier means for this addition, the movement of the air from the panel feed area can be blocked, so that fluctuations in the relative humidity of the first or second polarizing film draw area can be reduced, which makes possible easy control of the relative humidity.

The invention is to directed to a method for continuously manufacturing a liquid crystal display device by bonding a polarizing film to a liquid crystal panel with a pressure-sensitive adhesive interposed therebetween, includes:

a sheet piece supply step including drawing an optical film laminate from the continuous roll placed in a dry environment, wherein the continuous roll comprises a roll of an optical film laminate comprising at least sheet pieces of polarizing film having a width corresponding to a width of the liquid crystal panel and a carrier film on which the sheet pieces are placed with a pressure-sensitive adhesive interposed therebetween, and feeding the sheet pieces and the pressure-sensitive adhesive which are placed on the carrier film;

a liquid crystal panel supply step including feeding the liquid crystal panel in a first humid environment having a relative humidity higher than that of the dry environment; and a bonding step including bonding the sheet piece to the liquid crystal panel with the pressure-sensitive adhesive interposed therebetween in a second humid environment having a relative humidity higher than that of the dry environment, wherein the sheet piece is fed by the sheet piece supply step, and the liquid crystal panel is fed by the liquid crystal panel supply step.

According to this feature, moisture absorption of the continuous roll can be suppressed, so that wavy curling of the sheet piece of polarizing film can be suppressed from the draw start to the draw end and that the occurrence of bubbles or bonding misalignment can be successfully suppressed during the bonding to the liquid crystal panel. In addition, static build-up on the liquid crystal panel can be suppressed during the feeding of the liquid crystal panel or the bonding of the sheet piece of polarizing film, so that electrostatic destruction of circuits or deposition of foreign particles from the air can be successfully suppressed.

In an embodiment of the invention, in a continuous liquid crystal display device manufacturing area, a sheet piece draw area is separated from a panel feed area, wherein the continuous liquid crystal display device manufacturing area is an area in which the liquid crystal display device is continuously manufactured, the sheet piece draw area is an area in which the optical film laminate is drawn from the continuous roll, and the panel feed area is an area in which the liquid crystal panel and the liquid crystal display device are fed, the panel feed area is kept in a humid state, and the sheet piece draw area is kept in a state drier than the panel feed area.

According to this feature, the panel feed area having a humid state is separated from the sheet piece draw area, and the sheet piece draw area is kept in a state drier than the panel feed area, so that moisture absorption of the continuous roll, typically moisture absorption of the end face of the sheet piece, can be successfully suppressed and that wavy curling of the sheet piece can be successfully suppressed during the bonding of the sheet piece, and therefore, the occurrence of bubbles or bonding misalignment can be successfully suppressed during the bonding to the liquid crystal panel. The terms "humid state" and "dry state" have the same meanings as defined above.

In an embodiment of the invention, the sheet piece draw area has a relative humidity of from 10% RH to 45% RH.

This feature uses a "continuous roll including a roll of an optical film laminate including at least sheet pieces of polarizing film and a carrier film on which the sheet pieces are placed with a pressure-sensitive adhesive interposed therebetween (hereinafter such a roll will be referred to as a "continuous roll for sheet pieces" or a "scored continuous roll") and therefore differs from the above feature according to the invention which uses a "continuous roll including a roll of an optical film laminate including at least a polarizing film and a carrier film placed on the polarizing film with a pressure-sensitive adhesive interposed therebetween" (hereinafter such a roll will be referred to as a "continuous roll for a polarizing film"), but the mechanisms and effects thereof are the same. Specifically, when the relative humidity of the sheet piece draw area is kept at a level of 10% RH to 45% RH, moisture absorption of the continuous roll for sheet pieces, typically moisture absorption of the end face of the sheet piece, can be successfully suppressed, and wavy curling of the sheet piece can be successfully suppressed during the bonding of the sheet piece, and therefore, the occurrence of bubbles or bonding misalignment can be successfully suppressed during the bonding to the liquid crystal panel. It will be understood that the continuous roll for sheet pieces may be formed not only in a separate manufacturing line in advance but also in a continuous manufacturing system according to the invention.

In an embodiment of the invention, the panel feed area has a relative humidity more than 45% RH and less than 100% RH.

According to this feature, the relative humidity of the sheet piece draw area is kept at a level of 10% RH to 45% RH, and the relative humidity of the panel feed area is kept at a level more than 45% RH and less than 100% RH, so that electrostatic destruction of circuits or adsorption of foreign particles in the air due to static build-up on the liquid crystal panel can be avoided, moisture absorption of the continuous roll for sheet pieces, typically moisture absorption of the end face of the sheet piece, can be successfully suppressed, and wavy curling of the sheet piece can be successfully suppressed during the bonding of the sheet piece, and therefore, the occurrence of bubbles or bonding misalignment can be successfully suppressed during the bonding to the liquid crystal panel.

In an embodiment of the invention, the sheet piece draw area, the panel feed area, and a sheet piece feed area have relative humidities that satisfy
the relation (the relative humidity of the sheet piece draw area)≦(the relative humidity of the sheet piece feed area) or the relation (the relative humidity of the sheet piece feed area)≦(the relative humidity of the panel feed area), and
the relation (the relative humidity of the sheet piece draw area)<(the relative humidity of the panel feed area), wherein
the sheet piece feed area is an area in which the sheet piece is fed after it exits from the sheet piece draw area and until before it enters an inlet of the panel feed area.

According to this feature, the sheet piece feed area can be provided adjacent to and between the sheet piece draw area and the panel feed area, so that the relative humidity difference can be reduced between the sheet piece draw area and the panel feed area.

In an embodiment of the invention, in the sheet piece feed area, the sheet piece has a water content of less than 4.5%.

The invention is to directed to a method for continuously manufacturing a liquid crystal display device, comprises providing a sheet piece of polarizing film on each of both surfaces of a liquid crystal panel with a pressure-sensitive adhesive interposed therebetween by the method described above, wherein.

a first sheet piece draw area and a second sheet piece draw area are placed on one side of a continuous manufacturing area and, in planar view, opposed to a panel feed area that is placed on the other side of the continuous manufacturing area, wherein
the first sheet piece draw area is an area in which a sheet piece and a carrier film are drawn from a first continuous roll, and the second sheet piece draw area is an area in which a sheet piece and a carrier film are drawn from a second continuous roll.

According to this feature, the first and second sheet piece draw areas are opposed to the panel feed area in planar view, so that the first and second sheet piece draw areas do not overlap with the panel feed area along the vertical axis direction. Therefore, there is no need to take care of the movement of the air in the vertical direction, in which humid air can easily move, and the first or second sheet piece draw area and the panel feed area can be successfully configured to have different relative humidity environments, which makes it possible to successfully bond sheet pieces to both sides of a liquid crystal panel. In addition, the movement of the air from the panel feed area (which has a relative humidity higher than that of the air in the first or second sheet piece draw area) to the sheet piece draw area involves transverse movement in planar view. According to the feature, the cross-section of the path in the transverse direction can be small, and the movement of the air through the path only has to be blocked, which makes it possible to easily form barrier means for this. In addition, the movement of the air from the panel feed area can be blocked, so that fluctuations in the relative humidity of the first or second sheet piece draw area can be reduced, which makes possible easy control of the relative humidity.

The two perpendicularly-intersecting sides of the liquid crystal panel may be the same or different in length. Even when the width of the continuous roll is set equal to the length of any one side of the liquid crystal panel to which the sheet piece of polarizing film will be bonded, wavy curling of the continuous roll can be successfully suppressed according to the invention. Therefore, the entire width of the sheet piece of polarizing film obtained by transversely cutting the polarizing film can be successfully bonded to the liquid crystal panel without cutting and removal of a width part of the polarizing film.

The invention is to directed to a system for continuously manufacturing a liquid crystal display device by bonding a polarizing film to a liquid crystal panel with a pressure-sensitive adhesive interposed therebetween, includes:

polarizing film supply means that draws an optical film laminate from a continuous roll placed in a dry environment, wherein the continuous roll comprises a roll of an optical film laminate comprising at least a long polarizing film having a width corresponding to a width of the liquid crystal panel and a carrier film placed on the polarizing film with a pressure-sensitive adhesive interposed therebetween, cuts at least the polarizing film and the pressure-sensitive adhesive at predetermined intervals, while leaving the carrier film uncut, so that a sheet piece of the polarizing film and a pressure-sensitive adhesive piece are formed on the carrier film, and feeds the sheet piece and the pressure-sensitive adhesive piece which are placed on the carrier film;

liquid crystal panel supply means that feeds the liquid crystal panel in a first humid environment having a relative humidity higher than that of the dry environment; and bonding means that bonds the sheet piece to the liquid crystal panel with the pressure-sensitive adhesive piece interposed therebetween in a second humid environment having a relative humidity higher than that of the dry environment, wherein the sheet piece is fed by the polarizing film supply means, and the liquid crystal panel is fed by the liquid crystal panel supply means.

In an embodiment of the invention, the system further includes:

partition means that separates a polarizing film draw area from a panel feed area in a continuous liquid crystal display device manufacturing area, wherein the continuous liquid crystal display device manufacturing area is an area in which the liquid crystal display device is continuously manufactured, the polarizing film draw area is an area in which the optical film laminate is drawn from the continuous roll, and the panel feed area is an area in which the liquid crystal panel and the liquid crystal display device are fed; and humidity control means that keeps the panel feed area in a humid state and keeping the polarizing film draw area in a state drier than the panel feed area.

In an embodiment of the invention, the polarizing film draw area has a relative humidity of from 10% RH to 45% RH.

The invention is to directed to a system for manufacturing a liquid crystal display device by bonding a polarizing film to a liquid crystal panel with a pressure-sensitive adhesive interposed therebetween, includes:

sheet piece supply means that draws an optical film laminate from a continuous roll placed in a dry environment, wherein the continuous roll comprises a roll of an optical film laminate comprising at least sheet pieces of polarizing film having a width corresponding to a width of the liquid crystal panel and a carrier film on which the sheet pieces are placed with a pressure-sensitive adhesive interposed therebetween, and feeds the sheet pieces and the pressure-sensitive adhesive which are placed on the carrier film;

liquid crystal panel supply means that feeds the liquid crystal panel in a first humid environment having a relative humidity higher than that of the dry environment; and bonding means that bonds the sheet piece to the liquid crystal panel with the pressure-sensitive adhesive interposed therebetween in a second humid environment having a relative humidity higher than that of the dry environment, wherein the sheet piece is fed by the sheet piece supply means, and the liquid crystal panel is fed by the liquid crystal panel supply means.

In an embodiment of the invention, the system further includes:

partition means that separates a sheet piece draw area from a panel feed area in a continuous liquid crystal display device manufacturing area, wherein the continuous liquid crystal display device manufacturing area is an area in which the liquid crystal display device is continuously manufactured, the sheet piece draw area is an area in which the optical film laminate is drawn from the continuous roll, and the panel feed area is an area in which the liquid crystal panel is fed; and humidity control means that keeps the panel feed area in a humid state and keeping the sheet piece draw area in a state drier than the panel feed area.

In an embodiment of the invention, the sheet piece draw area has a relative humidity of from 10% RH to 45% RH.

The liquid crystal display device includes the liquid crystal panel and a sheet piece or pieces of polarizing film bonded to one or both sides of the liquid crystal panel, into which a driving circuit is incorporated as needed. The liquid crystal panel to be used may be of any type such as a vertical alignment (VA) type, an in-plane switching (IPS) type, a twisted nematic (TN) type, or a super twisted nematic (STN) type.

The "optical film laminate" includes at least a polarizing film or sheet pieces of polarizing film and a carrier film on which the polarizing film or the sheet pieces are placed with a pressure-sensitive adhesive interposed therebetween. For example, the polarizing film includes a polarizer (about 5 to about 80 μm in thickness) and a polarizer protecting film or films (generally about 1 to about 500 μm in thickness) formed on one or both sides of the polarizer with or without an adhesive. The optical film laminate may further include any other film such as a retardation film (generally 10 to 200 μm in thickness), a viewing angle compensation film, a brightness enhancement film, or a surface protecting film. The surface protecting film and the carrier film are each provided as a surface film to form the outermost surface of the optical film laminate, and typically made of a plastic film such as a polyethylene terephthalate film or a polypropylene film. The thickness of the optical film laminate is typically in the range of 10 μm to 500 μm. The "sheet piece of polarizing film" to be boded to the liquid crystal panel includes at least a polarizing film and optionally any of the above other films (such as a retardation film and a surface protecting film), which is placed thereon depending on the intended use.

DETAILED DESCRIPTION OF THE PREFERRED EMBODIMENTS

Figure 1:
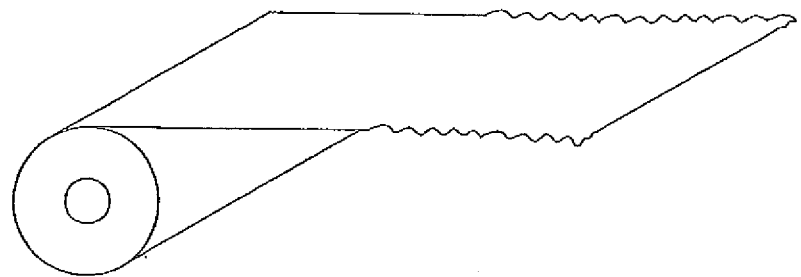
FIGS. 1A and 1B are schematic diagrams for illustrating wavy curling.
Figure 1:
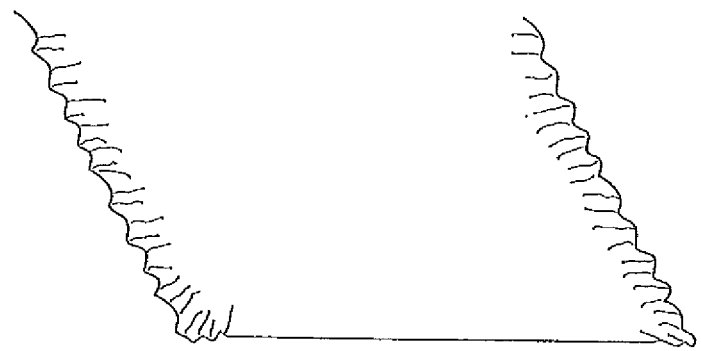

Method and System for Continuously Manufacturing Liquid Crystal Display Device

A method for continuously manufacturing a liquid crystal display device includes: a polarizing film supply step including drawing an optical film laminate from a continuous roll placed in a dry environment, wherein the continuous roll comprises a roll of an optical film laminate comprising at least a long polarizing film having a width corresponding to a width of the liquid crystal panel and a carrier film placed on the polarizing film with a pressure-sensitive adhesive interposed therebetween, cutting at least the polarizing film and the pressure-sensitive adhesive at predetermined intervals, while leaving the carrier film uncut, so that a sheet piece of the polarizing film and a pressure-sensitive adhesive piece are obtained, and feeding the sheet piece and the pressure-sensitive adhesive piece which are placed on the carrier film; a liquid crystal panel supply step including feeding a liquid crystal panel in a first humid environment having a relative humidity higher than that of the dry environment; and a bonding step including bonding the sheet piece to the liquid crystal panel with the pressure-sensitive adhesive piece interposed therebetween in a second humid environment having a relative humidity higher than that of the dry environment, wherein the sheet piece is fed by the polarizing film supply step, and the liquid crystal panel is fed by the liquid crystal panel supply step.

A polarizing film draw area is provided, in which the optical film laminate is drawn from the continuous roll. A polarizing film feed area is also provided, in which the optical film laminate (including the polarizing film) is fed after it exits from the polarizing film draw area and until before it enters the inlet of the panel feed area described below. In the polarizing film feed area, while the carrier film is left uncut, at least the polarizing film and the pressure-sensitive adhesive are cut at predetermined intervals to form a sheet piece of the polarizing film and a pressure-sensitive adhesive piece, and the sheet piece and the pressure-sensitive adhesive piece are fed to the bonding step, while they are placed on the carrier film. A liquid crystal panel feed area includes an area in which the liquid crystal panel is fed in the liquid crystal panel supply step and the bonding step. A liquid crystal display device feed area includes an area in which a liquid crystal display device with the sheet piece bonded to one side is fed after the bonding step.

In an embodiment of the invention, a system for continuously manufacturing a liquid crystal display device includes: polarizing film supply means for drawing an optical film laminate from a continuous roll placed in a dry environment, wherein the continuous roll includes a roll of an optical film laminate including at least a long polarizing film having a width corresponding to the width of a liquid crystal panel and a carrier film placed on the polarizing film with a pressure-sensitive adhesive interposed therebetween, cutting at least the polarizing film and the pressure-sensitive adhesive at predetermined intervals, while leaving the carrier film uncut, so that a sheet piece of the polarizing film and a pressure-sensitive adhesive piece are formed on the carrier film, and feeding the sheet piece and the pressure-sensitive adhesive piece which are placed on the carrier film; liquid crystal panel supply means for feeding the liquid crystal panel in a first humid environment having a relative humidity higher than that of the dry environment; and bonding means for bonding the sheet piece to the liquid crystal panel with the pressure-sensitive adhesive piece interposed therebetween in a second humid environment having a relative humidity higher than that of the dry environment, wherein the sheet piece is fed by the polarizing film supply means, and the liquid crystal panel is fed by the liquid crystal panel supply means.

Embodiment 1

In Embodiment 1, a polarizing film draw area and a panel feed area are configured to be separated from each other. For example, the panel feed area and the polarizing film draw area are each physically enclosed by partition means such as a partition board so that they are separated from each other. Alternatively, the partition means to be used may be means for controlling the air flow in each area so that the atmospheres in the respective areas are prevented from being mixed, such as an air curtain. The panel feed area includes: a liquid crystal panel feed area in which the liquid crystal panel is fed; and a liquid crystal display device feed area in which the liquid crystal display device is fed.

Figure 2A:
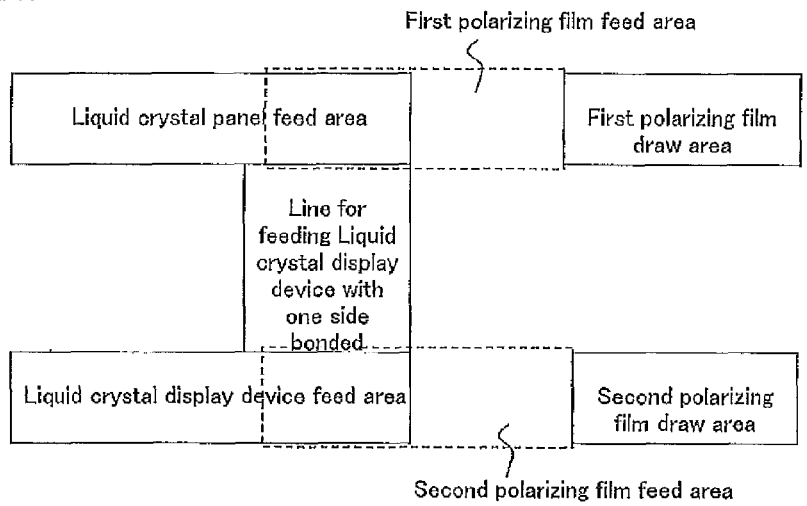
FIG. 2A is a diagram illustrating an example of the layout of a polarizing film draw area, a polarizing film feed area, and a panel feed area.
Figure 2B:
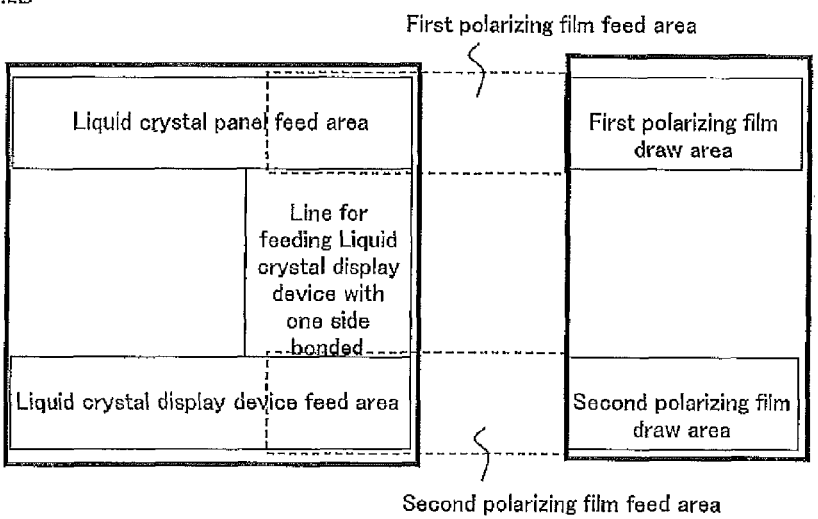
FIG. 2B is a diagram illustrating another example of the layout of a polarizing film draw area, a polarizing film feed area, and a panel feed area.
Figure 2C:
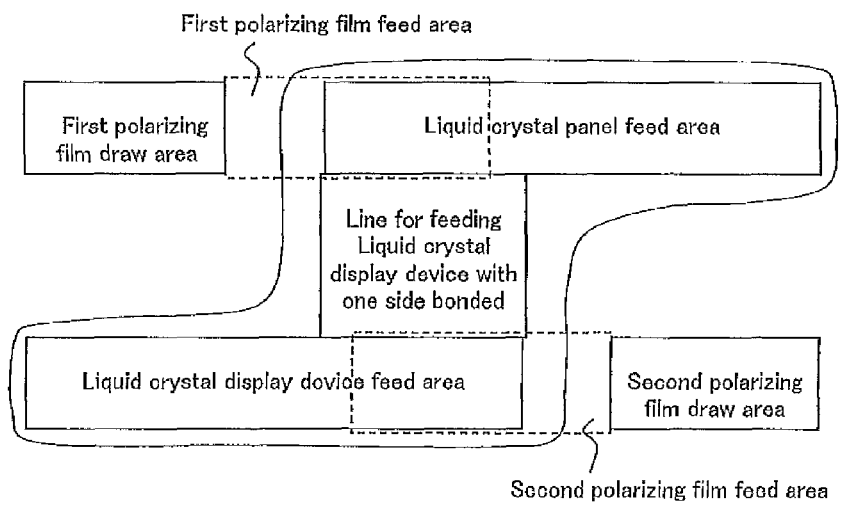
FIG. 2C is a diagram illustrating a further example of the layout of a polarizing film draw area, a polarizing film feed area, and a panel feed area.

FIGS. 2A, 2B, and 2C each show an example of the layout of the respective areas in planar view. In all the drawings, the polarizing film feed area overlaps in the vertical direction with the rear part of the liquid crystal panel feed area or the front part of the liquid crystal display device feed area. Although not shown in FIG. 2A, 2B, or 2C, the polarizing film bonding area is placed to overlap with the rear part of the liquid crystal panel feed area or the front part of the liquid crystal display device feed area.

As shown in FIG. 2A, the polarizing film draw area is placed opposite to the panel feed area in planar view. In FIG. 2A, the border of the polarizing film feed areas is indicated by broken lines, and the border of the other areas is indicated by solid lines. As shown in FIG. 2B, the first and second polarizing film draw areas may be combined into a single area (the area indicated by thick lines), and the panel feed areas may also be combined into a single area (the area indicated by other thick lines), so that the area range can be made broader than that shown in FIG. 2A. Although not shown, the first and second polarizing film feed areas (indicated by broken lines) may also be combined into a single area. It will be understood that the first and second polarizing films may be made of the same material or different materials.

The layout shown in FIG. 2A or 2B makes it possible to organize the polarizing film draw areas on one side in planar view so that they can be maintained in a dry environment (an environment with a low relative humidity) and also makes it possible to organize the panel feed areas on one side in planar view so that they can be maintained in a humid environment (an environment with a high relative humidity). Therefore, the layout shown in FIG. 2A or 2B can simplify the partition means, the devices, or other means for partitioning the areas. When the air flow is controlled with no physical enclosure in the layout shown in FIG. 2A or 2B, the range over which the areas with different humidity environments are placed adjacent to each other can be made narrower than that in the case where the areas are not opposite to each other, as shown in FIG. 2C, and the humidities of the respective areas can be suppressed from being mixed.

When the respective areas are separated from one another as described above, the amount of moisture absorption of the end part of the continuous roll can be reduced, and the difference in water content between the transverse center and end parts of the polarizing film can be reduced. Therefore, wavy curling deformation of the end part of the polarizing film can be suppressed, and the generation of bubbles can be suppressed during the bonding of the film to the liquid crystal panel. When the relative humidity is made high in the liquid crystal panel feed area or the liquid crystal display device feed area, the generation of static electricity can be prevented during the feeding of them, so that defects can be successfully prevented, which would otherwise occur in conventional techniques.

The temperature of each area is preferably in the range of from 10° C. to 30° C., which is the same as the range of the temperature in a normal clean room. Setting the inside of the manufacturing system lower than 10° C. or higher than 30° C. requires the installation of a heater or a cooler in each area, which will increase the size of the apparatus or complicate the apparatus.

Embodiment 2

Figure 3:
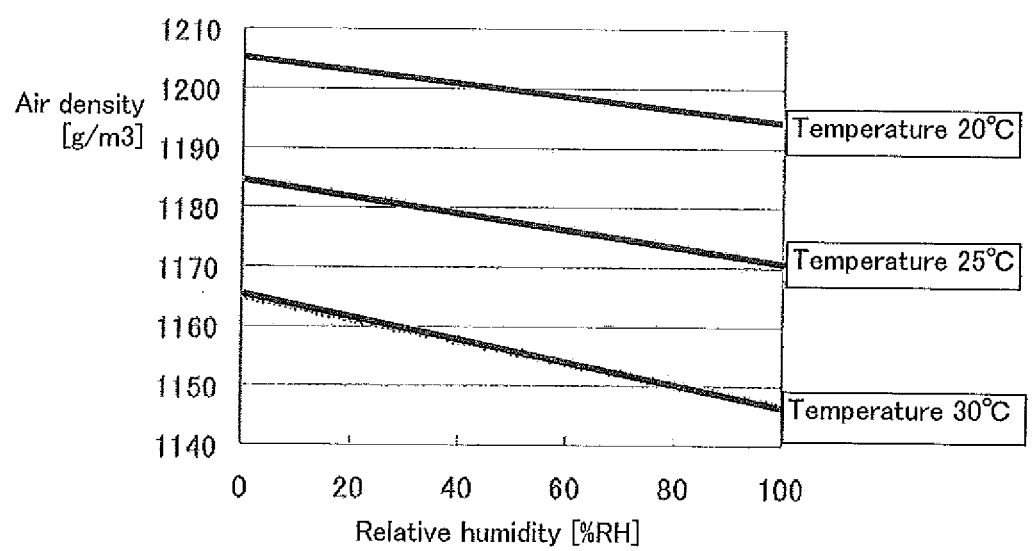
FIG. 3 is a graph for illustrating the density of humid air.

Panel feed areas (a liquid crystal panel feed area and a liquid crystal display device feed area) are placed above a polarizing film draw area and a polarizing film feed area. FIG. 3 shows the density of humid air. Even at the same temperature, the density of the air decreases with increasing humidity. Air with higher temperature and higher humidity will have lower density. Therefore, air with higher humidity is more likely to stay in the upper part of the apparatus than air with lower humidity.

Figure 4:
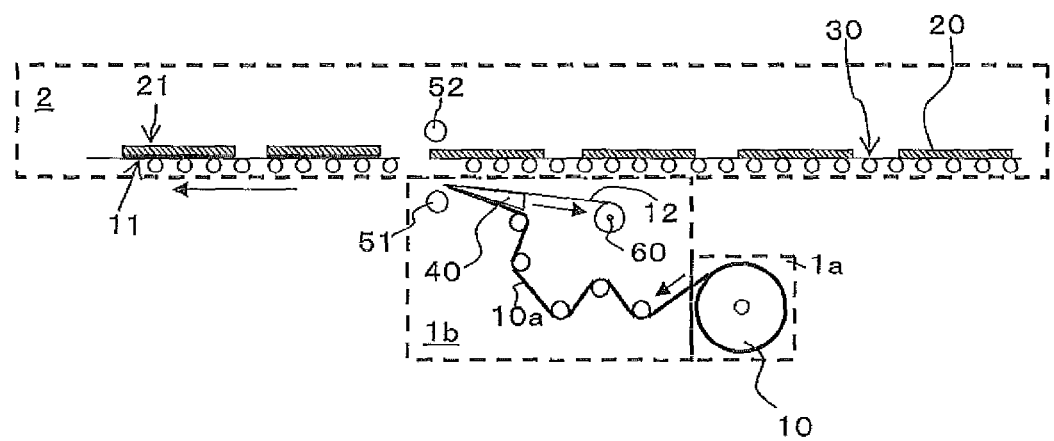
FIG. 4 is a diagram for illustrating an example of the method and system for continuously manufacturing a liquid crystal display device.

As shown in FIG. 4, taking advantage of this nature, a panel feed area 2 is placed in the vertically upper part of the continuous manufacturing system, and a polarizing film draw area 1a and a polarizing film feed area 1b are placed in the lower part of the continuous manufacturing system. High-humidity air is supplied to the panel feed area 2, and low-humidity air is supplied to the polarizing film draw area 1a. Accordingly, high-humidity air stays in the panel feed area 2, and low-humidity air stays in the polarizing film draw area 1a. Therefore, two areas with different humidity environments can be easily created in the same continuous manufacturing system. Such a configuration makes it possible to prevent static build-up on the liquid crystal panel or the liquid crystal display device and to prevent electrostatic destruction of circuits or adsorption of foreign particles on the liquid crystal panel. In addition, wavy curling deformation of the end part of the polarizing film can also be reduced, so that the generation of bubbles or bonding misalignment can be reduced during the bonding of the film to the liquid crystal panel. In addition, since the panel feed area 2 is placed above the polarizing film draw area 1a and the polarizing film feed area 1b, foreign particles, which are produced during the feeding of the polarizing film, are also prevented from falling onto the liquid crystal panel or the liquid crystal display device.

FIG. 4 illustrates an example of the method and system for continuously manufacturing a liquid crystal display device. The respective apparatuses of the continuous manufacturing system are controlled by a controller so that they can synchronously work together. In each area, for example, a humidifying device, a dehumidifying device, a humidity controller, or a drying device is placed as needed to serve as humidity controlling means so that the relative humidity in each area is controlled to be kept at a predetermined level.

In an embodiment of the invention, the polarizing film supply means draws the optical film laminate from the continuous roll placed in a dry environment, cuts the polarizing film and the pressure-sensitive adhesive at predetermined intervals while leaving the carrier film uncut, so that a sheet piece of the polarizing film and a pressure-sensitive adhesive piece are formed on the carrier film, and feeds the sheet piece and the pressure-sensitive adhesive piece while placing them on the carrier film. The liquid crystal panel supply means feeds the liquid crystal panel in a first humid environment having a relative humidity higher than that of the dry environment of the area in which the continuous roll is placed. The bonding means bonds the sheet piece to the liquid crystal panel in a second humid environment having a relative humidity higher than that of the dry environment of the area in which the continuous roll is placed, wherein the sheet piece is fed by the polarizing film supply means, and the liquid crystal panel is fed by the liquid crystal panel supply means. Specific embodiments of these means are described below.

A continuous roll 10 for a polarizing film, which is a roll of an optical film laminate 10a, is placed in the polarizing film draw area 1a. The optical film laminate 10a includes a surface protecting film, a polarizing film, and a carrier film 12, which are laminated in this order. The carrier film 12 is placed on one surface of the polarizing film with a pressure-sensitive adhesive (not shown) interposed therebetween. The surface protecting film (not shown) is placed on the surface of the polarizing film, where the carrier film 12 is not placed, with a pressure-sensitive adhesive (not shown) interposed therebetween. The optical film laminate 10a is drawn from the continuous roll 10 for the polarizing film and fed downstream.

For example, the feed means preferably includes feed rollers, nip rollers, tension rollers, dancer rollers, means 60 for taking up the carrier film 12, etc.

The fed optical film laminate 10a is subjected to cutting using cutting means (not shown), in which the surface protecting film, the polarizing film, and the pressure-sensitive adhesive are cut, while the carrier film 12 is left uncut, so that a sheet piece 11 of the polarizing film is formed. For example, the cutting means may be a laser, a cutter, or the like. The optical film laminate 10a is cut in a direction (width direction) perpendicular to the longitudinal direction of the optical film laminate 10a.

After the cutting, the sheet piece 11 is bonded to the liquid crystal panel 20 with the pressure-sensitive adhesive interposed therebetween, while the carrier film 12 is peeled off by peeling means 40. The liquid crystal panel 20 is taken out of the stock by substrate feed means (not shown), placed on feed rollers 30, and fed to the bonding position. The peeling means 40 is not restricted and may be configured to inwardly fold back the carrier film 12 at its front end relative to the sheet piece 11 so that the sheet piece 11 can be peeled off together with the pressure-sensitive adhesive piece from the carrier film 12. For example, the peeling means 40 is configured to have a knife edge which is triangular in side view. The bonding means for bonding the sheet piece 11 to the liquid crystal panel 20 is typically, but not limited to, a pair of rollers (a bonding roller 51 and a receiving roller 52).

While the above process includes providing the first sheet piece 11 on one side of the liquid crystal panel 20 to obtain a liquid crystal display device 21, a second sheet piece may be bonded to the other side. When the second sheet piece is bonded to the other side of the liquid crystal display device 21, the liquid crystal display device 21 is preferably turned over and turned by 90°. The turnover operation and the 90° rotation operation may be performed simultaneously or at different times or partially overlap with each other. When the liquid crystal display device 21 is turned over, a second polarizing film draw area and a second polarizing film feed area can be placed below the panel feed area. When the liquid crystal display device 21 is turned by 90°, the continuous manufacturing line can be configured to be arranged in a single line or to have a two-line layout as shown in FIG. 2A. When each area has the layout shown in FIG. 2A, the system can be configured so that the liquid crystal display device is turned by 90° in, upstream of, or downstream of the feed line for feeding the liquid crystal display device with the sheet piece of the polarizing film bonded to one side and can also be configured so that the liquid crystal display device is turned over and turned by 90°.

In the process of cutting the optical film laminate 10a to form a sheet piece of the polarizing film, the optical film laminate 10a may be cut in such a manner as to avoid defect portions based on defect information, so that a sheet piece 11 of a predetermined size or a defect-containing sheet piece, which is determined to be defective, can be formed. The defect information may be attached as a code or a mark to the continuous roll 10 or may be input as digital data into the controller. The defect information attached to the continuous roll 10 is read by a coder reader and sent to the controller. Examples of the defect information include coordinates of defects, defect type, and defect size. The system is configured so that the sheet piece determined to be defective is not bonded to the liquid crystal panel 20.

Other Embodiments

In another embodiment, the method includes: a sheet piece supply step including drawing an optical film laminate from a continuous roll for sheet pieces (a scored continuous roll) placed in a dry environment, wherein the continuous roll includes a roll of an optical film laminate including at least sheet pieces of polarizing film having a width corresponding to the width of a liquid crystal panel and a carrier film on which the sheet pieces are placed with a pressure-sensitive adhesive interposed therebetween, and feeding the sheet pieces and the pressure-sensitive adhesive which are placed on the carrier film; a liquid crystal panel supply step including feeding a liquid crystal panel in a first humid environment having a relative humidity higher than that of the dry environment; and a bonding step including bonding the sheet piece to the liquid crystal panel with the pressure-sensitive adhesive interposed therebetween in a second humid environment having a relative humidity higher than that of the dry environment, wherein the sheet piece is fed by the sheet piece supply step, and the liquid crystal panel is fed by the liquid crystal panel supply step. Therefore, a liquid crystal display device may be continuously manufactured by a process that includes: providing a continuous roll for sheet pieces, which includes a roll of an optical film laminate including at least sheet pieces of polarizing film having a width corresponding to the width of a liquid crystal panel and a carrier film on which the sheet pieces are placed with a pressure-sensitive adhesive interposed therebetween; drawing the optical film laminate from the continuous roll; peeling off the carrier film from the sheet piece and the pressure-sensitive adhesive; and bonding, to the liquid crystal panel, the pressure-sensitive adhesive which is peeled off and therefore has an exposed surface, so that the sheet piece is provided on the liquid crystal panel.

The continuous roll for sheet pieces may also be formed on the same continuous manufacturing line. In such a case, the continuous roll for sheet pieces is formed by a process that includes: providing a continuous roll including a roll of an optical film laminate including at least a long polarizing film having a width corresponding to the width of a liquid crystal panel and a carrier film placed on the polarizing film with a pressure-sensitive adhesive interposed therebetween; drawing the optical film laminate from the continuous roll; cutting at least the polarizing film and the pressure-sensitive adhesive at predetermined intervals, while leaving the carrier film uncut, so that sheet pieces of the polarizing film and pressure-sensitive adhesive pieces are obtained; and winding, into a roll, the carrier film on which the sheet pieces and the pressure-sensitive adhesive pieces are formed.

An example of the continuous manufacturing system for achieving the continuous manufacturing method is a system for manufacturing a liquid crystal display device by bonding a polarizing film to a liquid crystal panel with a pressure-sensitive adhesive interposed therebetween, which includes: sheet piece supply means for drawing an optical film laminate from a continuous roll for sheet pieces (a scored continuous roll) placed in a dry environment, wherein the continuous roll includes a roll of an optical film laminate including at least sheet pieces of polarizing film having a width corresponding to the width of the liquid crystal panel and a carrier film on which the sheet pieces are placed with a pressure-sensitive adhesive interposed therebetween, and feeding the sheet pieces and the pressure-sensitive adhesive which are placed on the carrier film; liquid crystal panel supply means for feeding the liquid crystal panel in a first humid environment having a relative humidity higher than that of the dry environment; and bonding means for bonding the sheet piece to the liquid crystal panel with the pressure-sensitive adhesive interposed therebetween in a second humid environment having a relative humidity higher than that of the dry environment, wherein the sheet piece is fed by the sheet piece supply means, and the liquid crystal panel is fed by the liquid crystal panel supply means. The sheet piece supply means can be achieved using the same apparatus as described above except that at least the cutting means is omitted. The liquid crystal panel supply means and the bonding means can also be achieved using the same apparatus configuration as described above.

Examples

Figure 5:
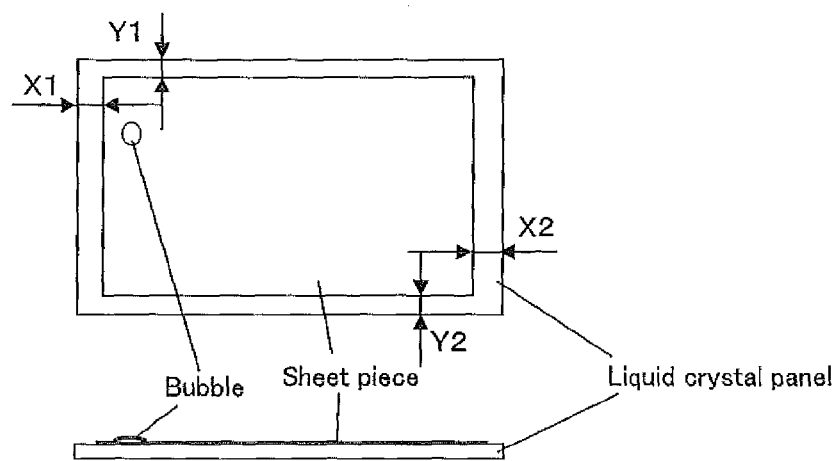
FIG. 5 is a diagram for illustrating a method of measuring the number of bubbles produced and the bonding accuracy.

In the layout according to each example, the humidity in each of the polarizing film draw area, the polarizing film feed area, and the panel feed area was controlled using a humidity controller, and a sheet piece of polarizing film was bonded to a liquid crystal panel at different relative humidities. In this case, evaluations were made of the number of bubbles produced, the bonding accuracy, the rate of occurrence of electrostatic destruction, the rate of occurrence of defects due to foreign particles, and the amount of static build-up on the liquid crystal panel. The number of bubbles produced by the bonding and the bonding accuracy were measured by the method shown in FIG. 5.

In the examples, experiments were performed using a non-alkali glass plate (405 mm in vertical length, 710 mm in transverse length) in place of the liquid crystal panel. The sheet piece of polarizing film was VEG1724DU manufactured by NITTO DENKO CORPORATION, which was 400 mm in vertical length and 700 mm in transverse length. Bubbles were visually observed, and ten pieces (n=10) were used in the visual evaluation of bubbles.

To evaluate the bonding accuracy, the sizes X1, X2, Y1, and Y2 were measured using a micro gauge (Micro Gauge ID-1025B manufactured by Mitutoyo Corporation). One hundred pieces (n=100) were used in the evaluation of the bonding accuracy. The difference between each measured value (X1, X2, Y1, Y2) and the predetermined target value was calculated, and the standard deviations and the average of them (average for n=100) were also calculated.

The amount (kV), of static build-up on the liquid crystal panel was measured using an electrostatic meter (Model KSD-2000 manufactured by KASUGA ELECTRIC WORKS LTD.). The measurement was performed at the outlet of the panel feed area after the bonding of the first sheet piece of polarizing film (upper sheet) and after the bonding of the second sheet piece (lower sheet). The average of one hundred measurements (n=100) was calculated in the evaluation.

In the inspection (visual inspection) after the bonding of the upper sheet and the lower sheet, the rate (%) of occurrence of defects due to foreign particles was calculated from the formula [the number of panels with a defect (bright spot) generated at a defective (NG) level]/[the number of all panels subjected to the bonding (n=100)]×100.

In the inspection after the bonding of the upper sheet and the lower sheet, the rate (%) of occurrence of electrostatic destruction was calculated from the formula [the number of panels in which electrostatic destruction occurred (so that part of the liquid crystal cell became abnormal due to the static build-up and was observed as light leakage)]/[the number of all panels subjected to the bonding (n=100)]×100.

The relative humidity was measured by a method including setting the humidity controller in each area at a desired value, then waiting until the value indicated by a hygrometer placed in each area was stabilized, and measuring the humidity.

(Production Conditions)

Examples 1 to 4 and Comparative Examples 1 to 5 were performed using a continuous roll for a polarizing film, and Example 5 and Comparative Examples 6 to 8 were performed using a continuous roll for sheet pieces (scored continuous roll). In Examples 1, 2, and 5 and Comparative Examples 1 to 3 and 5 to 8, the layout of each area was as shown in FIG. 2B. In Example 3, the layout of each area was as shown in FIG. 2C. According to the layout diagram (FIG. 2A, 2B, or 2C), the areas were separated from one another by a method of controlling the air flow with an air curtain so that mixing of the air between the areas would not occur. In Example 4 and Comparative Example 4, the vertical separation method shown in FIG. 4 (the vertical layout in Comparative Example 4 was reverse to that shown in FIG. 4) was used with no partition wall or air curtain placed therein.

Examples 1, 3, 4, and 5 each satisfy the first condition: the relative humidity of the polarizing film draw area (or the sheet piece draw area) is from 10% RH to 40% RH; the second condition: the relative humidity of the panel feed area is more than 45% RH and less than 100% RH; and the inter-area relative humidity conditions.

Example 2 satisfies the first condition, the second condition, and the inter-area relative humidity conditions, but does not satisfy the third condition: the sheet piece of polarizing film in the polarizing film feed area has a water content of less than 4.5%.

Comparative Examples 1 and 6 satisfy the first condition and the inter-area relative humidity conditions but do not satisfy the second condition.

Comparative Example 2 satisfies the first condition but does not satisfy the second condition. It also does not satisfy the inter-area relative humidity conditions, because the relative humidity of the polarizing film feed area is lower than that of the polarizing film draw area.

Comparative Examples 3, 4, and 7 do not satisfy the first condition but satisfy the second condition and the inter-area relative humidity conditions. In Comparative Examples 5 and 8, each area has a relative humidity of 72% RH.

The temperature of each of the polarizing film draw area, the sheet piece draw area, the polarizing film feed area, the sheet piece feed area, and the panel feed area was 20° C. (measured value).

(Evaluation Results)

The results of the evaluation are shown in Tables 1 and 2. Table 1 shows the results of the evaluation in which a continuous roll for a polarizing film was used, and Table 2 shows the results of the evaluation in which a continuous roll for sheet pieces was used. Tables 1 and 2 show that the results obtained in Examples 1 and 4 were better than those obtained in the other examples. Comparative Example 2 does not satisfy the inter-area relative humidity conditions. It is considered that in Comparative Example 2, the panel feed area was influenced by the humidity of the polarizing film feed area, so that the liquid crystal panel tended to be dried, and therefore, the rate of occurrence of the electrostatic destruction of the circuit was higher than that in the other examples. In Example 2, the relative humidity of the polarizing film feed area was relatively high, and the water content of the sheet piece was higher than that in the other examples, so that the rate of occurrence of bubbles was higher than that in the other examples. It is considered that in Example 4 (the layout shown in FIG. 4), the relative humidity of each area was successfully controlled according to the setting, but in Comparative Example 4 (the vertical layout was reverse to that shown in FIG. 4), the relatively humidity of each area was not able to be controlled according to the setting, so that the humid air moved from the panel feed area in the lower part of the continuous manufacturing system to the polarizing film draw area and the polarizing film feed area in the upper part.

In Example 3 or Comparative Example 2, the actually measured value differs from the set value of the relative humidity of the panel feed area. It is considered that this is because each area cannot be a completely sealed system or because air flow is generated by the flow of the polarizing film being fed. It is considered that particularly in the case of Example 3 using the layout shown in FIG. 2C, the areas with different humidities are in contact with each another at a relatively large part, and the contact faces are not in a single direction, so that the control with the air curtain was insufficient.

TABLE 1

| No. | Relative humidity of polarizing film draw area (% RH), measured value | Relative humidity of panel feed area (% RH), measured value | Layout | Relative humidity of polarizing film feed area (% RH), measured value | Set value of relative humidity of each area (polarizing film draw area/panel feed area/polarizing film feed area) | Water content of sheet piece at outlet of polarizing film feed area (%) | Rate of occurrence of bubbles (%) | Bonding accuracy (average of standard deviations) | Rate of occurrence of electrostatic destruction of circuit (%) | Rate of occurrence of defects due to foreign particles (%) | Amount of static build-up on liquid crystal panel (kV) |
|---|---|---|---|---|---|---|---|---|---|---|---|
| Example 1 | 31 | 72 | FIG. 2B | 60 | 31/72/60 | 4.2 | 1 | 0.10 | 1 | 0.7 | 0.30 |
| Example 2 | 31 | 72 | FIG. 2B | 70 | 31/72/70 | 4.6 | 8 | 0.16 | 1 | 0.7 | 0.30 |
| Example 3 | 40 | 52 | FIG. 2C | 43 | 31/72/60 | 3.8 | 1 | 0.11 | 3 | 2.4 | 0.60 |
| Example 4 | 31 | 72 | FIG. 4 | 60 | 31/72/60 | 4.2 | 1 | 0.10 | 1.1 | 0.7 | 0.30 |
| Comparative Example 1 | 31 | 35 | FIG. 2B | 33 | 31/35/33 | 3.5 | 2 | 0.10 | 5 | 3.5 | 1.10 |
| Comparative Example 2 | 31 | 40 | FIG. 2B | 22 | 31/72/22 | 3.1 | 1 | 0.10 | 4.6 | 3.2 | 1.00 |
| Comparative Example 3 | 60 | 72 | FIG. 2B | 62 | 60/72/62 | 4.0 | 41 | 0.45 | 1.5 | 0.8 | 0.35 |
| Comparative Example 4 | 62 | 65 | Reverse to FIG. 4A | 63 | 31/72/60 | 4.3 | 42 | 0.45 | 1.7 | 1.0 | 0.40 |
| Comparative Example 5 | 72 | 72 | FIG. 2B | 72 | 72/72/72 | 4.7 | 50 | 0.53 | 1.2 | 0.8 | 0.33 |

TABLE 2

| No. | Relative humidity of sheet piece draw area (% RH), measured value | Relative humidity of panel feed area (% RH), measured value | Layout | Relative humidity of sheet piece feed area (% RH), measured value | Set value of relative humidity of each area (sheet piece draw area/panel feed area/sheet piece feed area) | Water content of sheet piece at outlet of sheet piece feed area (%) | Rate of occurrence of bubbles (%) | Bonding accuracy (average of standard deviations) | Rate of occurrence of electrostatic destruction of circuit (%) | Rate of occurrence of defects due to foreign particles (%) | Amount of static build-up on liquid crystal panel (kV) |
|---|---|---|---|---|---|---|---|---|---|---|---|
| Example 5 | 31 | 72 | FIG. 2B | 60 | 31/72/60 | 4.3 | 2 | 0.10 | 1.1 | 0.8 | 0.30 |
| Comparative Example 6 | 31 | 35 | FIG. 2B | 33 | 31/35/33 | 3.5 | 2 | 0.10 | 5.0 | 3.4 | 1.00 |
| Comparative Example 7 | 60 | 72 | FIG. 2B | 64 | 60/72/64 | 4.2 | 40 | 0.44 | 1.3 | 0.7 | 0.30 |
| Comparative Example 8 | 72 | 72 | FIG. 2B | 72 | 72/72/72 | 4.8 | 52 | 0.54 | 1.1 | 0.7 | 0.31 |

What is claimed is:

1. A method for continuously manufacturing a liquid crystal display device by bonding a polarizing film to a liquid crystal panel with a pressure-sensitive adhesive interposed therebetween, comprising:

a polarizing film supply step comprising drawing an optical film laminate from a continuous roll placed in a dry environment, wherein the continuous roll comprises a roll of an optical film laminate comprising at least a long polarizing film having a width corresponding to a width of the liquid crystal panel and a carrier film placed on the polarizing film with a pressure-sensitive adhesive interposed therebetween, cutting at least the polarizing film and the pressure-sensitive adhesive at predetermined intervals, while leaving the carrier film uncut, so that a sheet piece of the polarizing film and a pressure-sensitive adhesive piece are obtained, and feeding the sheet piece and the pressure-sensitive adhesive piece which are placed on the carrier film;

a liquid crystal panel supply step comprising feeding the liquid crystal panel in a first humid environment having a relative humidity higher than that of the dry environment; and a bonding step comprising bonding the sheet piece to the liquid crystal panel with the pressure-sensitive adhesive piece interposed therebetween in a second humid environment having a relative humidity higher than that of the dry environment, wherein the sheet piece is fed by the polarizing, film supply step, and the liquid crystal panel is fed by the liquid crystal panel supply step.

2. The method according to claim 1, wherein in a continuous liquid crystal display device manufacturing area, a polarizing film draw area is separated from a panel feed area, wherein the continuous liquid crystal display device manufacturing area is an area in which the liquid crystal display device is continuously manufactured, the polarizing film draw area is an area in which the optical film laminate is drawn from the continuous roll, and the panel feed area is an area in which the liquid crystal panel and the liquid crystal display device are fed, the panel feed area is kept in a humid state, and the polarizing film draw area is kept in a state drier than the panel feed area.

3. The method according to claim 2, wherein the polarizing film draw area has a relative humidity of from 10% RH to 45% RH.

4. The method according, to claim 2, wherein the panel feed area has a relative humidity more than 45% RH and less than 100% RH.

5. The method according to claim 2, wherein the polarizing film draw area, the panel feed area, and a polarizing film feed area have relative humidities that satisfy the relation (the relative humidity of the polarizing film draw area)≦(the relative humidity of the polarizing film feed area) or the relation (the relative humidity of the polarizing film feed area)≦(the relative humidity of the panel feed area), and the relation (the relative humidity of the polarizing film draw area)<(the relative humidity of the panel feed area), wherein the polarizing film feed area is an area in which the polarizing film is fed after it exits from the polarizing film draw area and until before it enters an inlet of the panel feed area.

6. The method according to claim 5, wherein in the polarizing film feed area, the polarizing film or the sheet piece has a water content of less than 4.5%.

7. A method for continuously manufacturing a liquid crystal display device, comprising providing a sheet piece of polarizing film on each of both surfaces of a liquid crystal panel with a pressure-sensitive adhesive interposed therebetween by the method according to claim 2, wherein a first polarizing film draw area and a second polarizing film draw area are placed on one side of a continuous manufacturing area and, in planar view, opposed to a panel feed area that is placed on the other side of the continuous manufacturing area, wherein the first polarizing film draw area is an area in which a polarizing film and a carrier film are drawn from a first continuous roll, and the second polarizing film draw area is an area in which a polarizing film and a carrier film are drawn from a second continuous roll.

8. A method for continuously manufacturing a liquid crystal display device by bonding a polarizing film to a liquid crystal panel with a pressure-sensitive adhesive interposed therebetween, comprising:

a sheet piece supply step comprising drawing an optical film laminate from the continuous roll placed in a dry environment, wherein the continuous roll comprises a roll of an optical film laminate comprising at least sheet pieces of polarizing film having a width corresponding to a width of the liquid crystal panel and a carrier film on which the sheet pieces are placed with a pressure-sensitive adhesive interposed therebetween, and feeding the sheet pieces and the pressure-sensitive adhesive which are placed on the carrier film;

a liquid crystal panel supply step comprising feeding the liquid crystal panel in a first humid environment having a relative humidity higher than that of the dry environment; and a bonding step comprising bonding the sheet piece to the liquid crystal panel with the pressure-sensitive adhesive interposed therebetween in a second humid environment having a relative humidity higher than that of the dry environment, wherein the sheet piece is fed by the sheet piece supply step, and the liquid crystal panel is fed by the liquid crystal panel supply step.

9. The method according to claim 8, wherein in a continuous liquid crystal display device manufacturing area, a sheet piece draw area is separated from a panel feed area, wherein the continuous liquid crystal display device manufacturing area is an area in which the liquid crystal display device is continuously manufactured, the sheet piece draw area is an area in which the optical film laminate is drawn from the continuous roll, and the panel feed area is an area in which the liquid crystal panel and the liquid crystal display device are fed, the panel feed area is kept in a humid state, and the sheet piece draw area is kept in a state drier than the panel feed area.

10. The method according to claim 9 wherein the sheet piece draw area has a relative humidity of from 10% RH to 45% RH.

11. The method according to claim 9, wherein the panel feed area has a relative humidity more than 45% RH and less than 100% RH.

12. The method according to claim 9, wherein the sheet piece draw area, the panel feed area, and a sheet piece feed area have relative humidities that satisfy the relation (the relative humidity of the sheet piece draw area)≦(the relative humidity of the sheet piece feed area) or the relation (the relative humidity of the sheet piece feed area)≦(the relative humidity of the panel feed area), and the relation (the relative humidity of the sheet piece draw area)<(the relative humidity of the panel feed area), wherein the sheet piece feed area is an area in which the sheet piece is fed after it exits from the sheet piece draw area and until before it enters an inlet of the panel feed area.

13. The method according to claim 12, wherein in the sheet piece feed area, the sheet piece has a water content of less than 4.5%.

14. A method for continuously manufacturing a liquid crystal display device, comprising providing a sheet piece of polarizing film on each of both surfaces of a liquid crystal panel with a pressure-sensitive adhesive interposed therebetween by the method according to claim 9, wherein a first sheet piece draw area and a second sheet piece draw area are placed on one side of a continuous manufacturing area and, in planar view, opposed to a panel feed area that is placed on the other side of the continuous manufacturing area, wherein the first sheet piece draw area is an area in which a sheet piece and a carrier film are drawn from a first continuous roll, and the second sheet piece draw area is an area in which a sheet piece and a carrier film are drawn from a second continuous roll.

* * * * *